United States Patent [19]

Hjersted

[11] Patent Number: 5,213,692

[45] Date of Patent: May 25, 1993

[54] PROCESS FOR PREPARING PREFERRED IRON HUMATES

[75] Inventor: Lawrence N. Hjersted, St. Louis, Mo.

[73] Assignee: Kemiron, Inc., St. Louis, Mo.

[21] Appl. No.: 751,872

[22] Filed: Aug. 28, 1991

[51] Int. Cl.$^5$ .............................................. C02F 1/52
[52] U.S. Cl. .................................... 210/709; 71/24; 71/DIG. 2; 210/710; 210/724; 210/770; 210/917
[58] Field of Search ............. 71/24, DIG. 2; 210/609, 210/702, 709, 710, 723-728, 770, 917

[56] References Cited

U.S. PATENT DOCUMENTS

| | | | |
|---|---|---|---|
| 1,757,526 | 5/1930 | Hedgepeth | 210/917 |
| 2,317,990 | 5/1943 | Grether | 71/24 |
| 3,736,255 | 5/1973 | Ghassemi et al. | 210/917 |
| 3,872,002 | 3/1975 | Musgrove | 210/711 |
| 3,985,536 | 10/1976 | Abbe et al. | 210/734 |
| 4,668,404 | 5/1987 | Walterick | 210/917 |
| 4,743,287 | 5/1988 | Robinson | 71/24 |

OTHER PUBLICATIONS (ISSN 0065-2393), *Aquatic Humic Substances*, pp. xvii--xxx, 83-105, 281-295, 385-408, 425-442, 453-471, 1989 American Chemical Society.

Dell'Agnola, G. and Nardi, S., *Iron Uptake by Plants From Ferric-Humate Suspensions*, pp. 179-194, 1986.

Hecht-Buchholz, Ch. and Ortmann, U., "Effect of Foliar Iron Application on Regreening and Chloroplast Development In Iron-Chlorotic Soybean", pp. 647-659, 1986 *Journal of Plant Nutrition*.

Hsu, H. H. and Ashmead, H. D., "Effect of Urea and Ammonium Nitrate on the Uptake of Iron Through Leaves", pp. 291-299, 1984 *Journal of Plant Nutrition*.

(ISBN 0-87371-083-5), *Land Application of Sludge*, 1987 Lewis Publishers, Inc.

(ISBN 0-89867-523-5), *Land Application of Water Treatment Sludges: Impact and Management*, 1990 AWWA Research Foundation.

Narkis, Nava and Rebhun, Menahem, "Stoichiometric Relationship Between Humic and fulvic Acids and Flocculants", pp. 325-328, Jun. 1977 *Journal of AWWA*.

*Recommended Fertilizers and Nutritional Sprays for Citrus*, Mar. 1984, U.S.D.A. Bulletin 536D.

Reed, David Wm., "Effect of Urea, Ammonium and Nitrate on Foliar Absorption of Ferric Citrate", pp. 1429-1437, 1988 *Journal of Plant Nutrition*.

*Primary Examiner*—Peter Hruskoci
*Attorney, Agent, or Firm*—Litman, McMahon & Brown

[57] ABSTRACT

A process is provided for preparing preferred iron humate products. The preferred iron humate products provide iron and other nutrients and organic matter for vegetation. The preferred iron humate products are produced by using an iron salt coagulant that is relatively free of heavy metal contaminants and reacting the iron salt coagulant with naturally occurring humic substances such as those found in natural surface waters used in drinking water treatment facilities. According to the invention, iron is stoichiometrically reacted at a controlled pH with the humic and fulvic acid fractions in the water to precipitate an iron humate product precipitate. A preferred concentration of iron salt coagulants is used in order to minimize the formation of iron hydroxides which generally provide low iron availability to the plant. A more readily soluble iron humate complex is produced by the reacting and or blending of the iron humate residue with various nitrogen containing sources.

15 Claims, No Drawings

PROCESS FOR PREPARING PREFERRED IRON HUMATES

BACKGROUND OF THE INVENTION

The present invention relates to a process for preparing a preferred iron humate product, compositions of preferred iron humate products and a method for treating chlorosis in vegetation using preferred iron humate products.

Many agricultural crops and turf grasses must have commercial applications of iron nutrients in order to prevent or correct for iron deficiency otherwise known as plant chlorosis. Chlorosis can be physically detected by yellowing of leaves in trees, shrubs, and vegetables and yellowing of blades within turf grasses. Chlorosis hinders plant growth or yields and can also lessen food quality. Additionally, many soils are deficient in organic substances which can have a favorable effect on soil moisture retention, plant nutrient uptake and plant growth. There are many commercial iron nutrient sources available to correct for iron chlorosis such as ferrous sulfate and chelated irons such as sodium ferric ethylenediamine di-(O-hydroxy-phenol-acetate)('-'FeEDDHA") sold under the trade names Sequesterene 138-Fe and Libfer SP.

A separate problem has been the disposal of sludge or precipitates formed by coagulating raw water contaminants with iron and aluminum salts or the like at potable water treatment plants and at plants designed to remove the organic color from effluents from such sources as paper mills. This is especially true for surface waters which are characterized by their high content of dissolved organic color from the natural decaying of aquatic vegetation. These potable water treatment plants must use high coagulant dosages, which in turn, generate large quantities of sludge residue for disposal. Often the water treatment sludges are simply dumped back into the water source causing degradation of the water quality. Other currently preferred options for disposal of water treatment sludges are lagoon storage, disposal in landfills and discharge into sanitary sewers. Inadequacies in these disposal methods has led to an increased interest in the land application of water treatment sludge.

Important constituents of natural surface waters are aquatic humic substances. Humic substances are formed from the decomposition of plant and animal materials and comprise the largest fraction of natural organic matter in natural surface waters accounting for 40 to 60 percent of the dissolved organic carbon ("DOC"; DOC is defined as organic carbon particles smaller than 0.45 micrometers in diameter and may be in colloidal suspension rather than in solution).

Humic substances comprise a complex heterogeneous mixture of compounds that are not readily separated into discrete components. However, three subfractions of humic substances are generally recognized. These subfractions comprise humic acid, fulvic acid and humin. Humic acid is defined as the fraction of humic substances that is not soluble in water under highly acidic conditions (pH<2.0) but is soluble at higher pH values. Fulvic acid is defined as the fraction of humic substances that is soluble in water under all pH conditions. Humin is defined as the fraction of humic substances that is not soluble in water at any pH value.

Humic substances are removed from raw drinking water due to several problems associated with their presence. Humic substances are responsible for the yellow or brown organic color of natural surface waters. Humic substances act as a vehicle for the transport of toxic, water insoluble elements and organic micropollutants. Chlorine combines with aquatic humic substances to form chlorinated organic compounds, such as chloroform and complex chlorinated compounds, that may have negative effects on health. Humic substances also precipitate in water distribution systems where they lead to deterioration of tap water quality and increase the need for interior cleaning of pipes.

Traditionally, colored surface waters have been treated with alum (aluminum sulfate) which generates an aluminum containing sludge, which after dewatering, must be deposited in a secure landfill. Iron salt coagulants have been effectively used but often produce a sludge high in heavy metals due to the quality of the iron salt coagulant. Many of the commercial iron salt coagulants are produced from by-products from such sources as $TiO_2$ production or steel pickling and are typically high in heavy metals and organic contaminants.

When an iron salt coagulant is used as the primary coagulant to remove humic substances, it reacts to precipitate an iron humate residue. The inferior quality of many iron salt coagulants, in terms of concentration of heavy metal contaminants, often results in iron humate products having unacceptable concentrations of heavy metals so as to prevent land application of the iron humate products.

Another problem with current potable water treatment methods is that these methods generally result in a water treatment sludge having unnecessarily high concentrations of hydrous metal oxides, such as iron hydroxides. Hydrous metal oxides are strong adsorbents of trace metals and phosphorus. When applied to the soil surrounding vegetation at high concentrations and high pH, iron hydroxides can result in metal deficiencies in the vegetation including iron deficiency. Also the presence of hydrous metal oxides results in the sorption of phosphorous from the soil reducing the availability of phosphorus to vegetation. Phosphorous is necessary for vegetation growth. Additionally, iron hydroxides do not dewater as well as iron humate products. The iron hydroxides form a somewhat gelatinous mass making sludge containing excess iron hydroxides harder to handle and more expensive to transport.

SUMMARY OF THE INVENTION

The present invention provides preferred iron humate products and processes for preparing preferred iron humate products adapted for use in treating chlorosis in vegetation.

Existing water treatment processes focus primarily on producing high quality drinking water with little regard for the quality of the resultant sludge. The goal of the water treatment process of the present invention is to produce o both high quality drinking water and a high quality sludge that is particularly well adapted for land application to provide useful nutrients to plants.

The concentration of heavy metal contaminants in the resultant iron humate product is reduced by selecting a relatively pure iron salt coagulant that is free of or has a relatively low concentration of heavy metal contaminants.

The concentration of iron hydroxides in the resultant iron humate product is minimized by using a minimum dosage of iron salts to effect the required color removal of the raw water. The iron salt dosage is minimized by identifying and then coagulating the raw water at an optimum reaction or coagulation pH. The optimum coagulation pH is identified, preferably by analytical tests of water samples. A typical optimum coagulation pH range from 3.8 to 5.5 for most iron salt coagulants and most colored surface waters.

The resultant iron humate products are relatively insoluble but still function as a source of iron nutrients during interactions with plants in soil media. More soluble iron humate products may be produced by contacting, the resultant iron humate products with a nitrogen source so as to produce a nitrogen enriched iron humate product that contains nitrogen in the range of 0.5 to 12 percent by weight as nitrogen with a minimum water soluble iron content of 50 ppm as iron. Both the unmodified iron humate product and the nitrogen enriched iron humate product are relatively inexpensive and beneficial sources of iron and humic substances for application to and use by plants.

OBJECTS AND ADVANTAGES OF THE INVENTION

Therefore, the objects of this invention are to provide a method for running a water purification facility to produce high quality drinking water and to produce a high quality sludge useable in providing needed nutrients to vegetation; to produce commercial, high quality, low cost, iron humate products especially suitable for addition to soil as an iron nutrient and organic soil additives for the benefit of vegetation; to produce such iron humate products having a relatively low concentration of heavy metal contaminants; to produce such iron humate products through the use of high quality iron salts as coagulants in the water treatment process; to produce such iron humate products having a minimum concentration of iron hydroxides; to produce such iron humate products through the controlled addition of iron salt coagulants; and to produce a modified iron humate product with more soluble iron which is more rapidly available for plant uptake and the correction of iron deficiency.

Other objects and advantages of this invention will become apparent from the following description wherein are set forth, by way of illustration and example, certain embodiments of this invention.

DETAILED DESCRIPTION OF THE INVENTION

As required, detailed embodiments of the present invention are disclosed herein; however, it is to be understood that the disclosed embodiments are merely exemplary of the invention, which may be embodied in various forms. Therefore, specific composition and functional details disclosed herein are not to be interpreted as limiting, but merely as a basis for the claims and as a representative basis for teaching one skilled in the art to variously employ the present invention in virtually any appropriately detailed embodiment.

The present invention concerns the production of preferred iron humate products from water treatment processes to be used in treating vegetation and in particular crops and the like suffering from iron deficiencies generally referred to as chlorosis. The preparation of the iron humate products or residuals involves the controlled addition of a iron salt coagulant to raw water in a water treatment plant. The iron salt coagulant reacts with organic color producing aquatic humic substances or species in the raw water to form an iron humate product or precipitate which when applied to plants provides useful organic matter and nutrients such as iron. The preferred iron salt coagulant for the process is ferric sulfate or polyferric sulfate. Other acceptable iron salts are ferric chloride, ferrous chloride, polyferric chloride, and ferrous sulfate and the like. In order to be acceptable the iron salt coagulant used should be of high purity in terms of generally being free of or having a relatively low heavy metal and organic contamination such as organic corrosion inhibitors and tri-halomethane precursors.

Preferably the iron salt coagulant is produced from virgin iron sources and virgin acid sources so as to minimize the extraneous contaminants which may not be environmentally safe to apply to soil or may be harmful to vegetation. Table I gives a typical specification of a ferric sulfate coagulant that is suitable for treating at least some raw surface water under the present invention. However, allowable contaminant levels may differ depending on the water to be treated and the desired end use application of the recovered iron humate product. The allowable contaminants specified in Table I are stricter than the American Water Works Association (AWWA) current standard for ferric sulfate because this standard only addresses the effects of contaminants in the coagulant on the resultant treated water and not the quality of the resultant sludge residue.

TABLE I

| Impurity | Maximum Impurity Concentration (mg/kg) |
|---|---|
| Arsenic | 2 |
| Cadmium | 2 |
| Chromium | 5 |
| Lead | 10 |
| Mercury | 1 |
| Selenium | 3 |
| Silver | 5 |
| Nitrites | 75 |
| Total Organic Carbon | 15 |
| Copper | 5 |
| Zinc | 10 |
| Manganese | 90 |
| Barium | 6 |
| Chloride | 100 |
| Fluoride | 60 |
| Titanium | 50 |
| Nitrates | 150 |
| Sodium | 1000 |

The most critical parameter affecting the quality of the resultant iron humate product is the reaction or coagulation pH. The optimum coagulation pH will vary depending on the type of surface water, the concentration of organic species present and the type of iron salt coagulant used. The optimum pH in an actual water treatment plant is determined using analytical jar tests of water samples in an iterative approach. A selected quantity of water to be treated is collected in several jars. The pH of the water in the jars is adjusted by the addition of an acid such as sulfuric acid such that the pH of each of the jars is different. A selected quantity of iron salt coagulant is added to each jar and the contents are agitated and then allowed to react or coagulate and then settle. The pH of the jar having the greatest raw water color reduction is identified. Several more jars are filled with a selected quantity of the water to be treated. The pH of the water in these jars is adjusted to match the pH identified in the first jar test as resulting in the greatest raw water color reduction. Various quantities of iron salt coagulant are then added to these jars. The contents are agitated and then allowed to react or coagulate and then settle. The smallest quantity of iron salt coagulant effecting a preselected or desired level of color reduction is identified. Using the identified minimum quantity of iron salt coagulant resulting in the desired color reduction another set of jar tests can be conducted to identify the pH resulting in the greatest color reduction with the identified minimum quantity of iron salt coagulant. Typically two iterations of the jar tests are completed to identify an optimum coagulation pH for effecting color reduction and the minimal quantity of iron salt coagulant at that pH to effect the desired reduction. Typical optimum coagulation pH values range from 3.8 to 5.5 for most iron salt coagulants and most colored surface waters.

Controlling the optimum pH insures using the minimum dosage of iron salt coagulant to effect the required color removal of the raw water. It is theorized that excess iron salts form insoluble iron hydroxides which are not taken up by plants as opposed to the preferred iron humate products. Because iron hydroxides are strong adsorbents of trace metals and phosphorous, the presence of the hydroxides in the sludge applied to vegetation can result in metal deficiencies in plants including phosphorous and iron deficiencies. The adsorption of iron from the soil by iron hydroxides may reduce the availability of iron from the preferred iron humate product. Additionally, iron hydroxides do not dewater as well as iron humate products and form a gelatinous mass. The production of excess iron hydroxides results in a product that is more difficult to handle and more expensive to transport Although the iron humate products are also very insoluble, they can still function as a source of iron nutrients during interactions with plants in soil media. Although it is not the intent of applicant to be bound to any specific theory of how such iron is used by the vegetation, it is theorized that in the soil, the iron humate products are converted into a useable form by vegetation allowing the uptake of iron by the vegetation.

In an actual water treatment plant application, analytical jar tests should be conducted frequently to verify the optimum treatment pH setpoint and minimum effective iron dosage rate and to compensate for changes in the chemical composition of the raw water to be treated. Although an excess iron salt coagulant dosage will still produce a high quality drinking water, it will produce excess and undesirable iron hydroxides in precipates removed from the water and used herein to provide nutrients to vegetation.

The preferred water treatment process of the present invention may be incorporated into a continuous flow water treatment system or a batch water treatment system. The steps of the process of the present invention are essentially the same when incorporated into either a continuous flow or batch treatment system except that the steps are time based in a batch reactor and position or location based in a continuous flow reactor.

In a continuous flow water treatment system the pH of the raw Water in an influent raw water stream is initially lowered to a previously identified optimum coagulation pH in an acidification zone. The pH may be lowered by the addition of an auxiliary acid such as sulfuric acid or by means such as bubbling $CO_2$ into the raw water to form carbonic acid and by other means generally known in the art.

The efficiency of the treatment process appears to improve when the pH of the raw water is lowered prior to the addition of an iron salt coagulant as opposed to lowering of the pH concurrently with or after the addition of an iron salt coagulant. However, the pH of the raw water may be lowered before, after or during the addition of the iron salt coagulant. Also, for pH control and iron salt coagulant dosage efficiency purposes, it is preferred to use an iron salt coagulant with very low free acidity, so that the pH may be controlled independent of the iron salt dosage. As discussed above, the optimum coagulation pH may change due to changes in the composition of the raw water. Analytical jar tests are conducted regularly to identify changes in the optimum coagulation pH and the pH of the water to be treated is adjusted accordingly.

Downstream of the acidification zone, an iron salt coagulant is added to the influent raw water stream in a flash mixing zone to form a treatment solution. The iron salt coagulant is added to the influent raw water stream at a rate previously calculated to provide the minimum dosage of iron salt coagulant necessary to effect the required color removal from the raw water. As discussed above analytical jar tests are conducted regularly to identify any changes in the minimum dosage necessary to effect the required color removal due to changing characteristics of the raw water. The rate of addition of iron salt coagulant is adjusted to correspond to any identified changes in the minimum dosage requirement.

Impellers are preferably used in the flash mixing zone to provide rapid, thorough mixing of the raw water and the iron salt coagulant, however it is foreseeable that other rapid mixing means may be incorporated into the process of the present invention The iron salt coagulant and the raw water are preferably mixed in the flash mixing zone for a minimum of 15 seconds. This initial mixing is followed by at least 3 minutes and preferably at least 10 minutes of additional mixing such as is available in a flocculation type mixing zone located downstream of the flash mixing zone. The reaction of the iron salt coagulant with the humic substances and other organic matter in the raw water is nearly complete within three minutes for temperate waters and longer for colder waters. The reaction of iron salt coagulant and humic substances forms iron humate products.

After the reaction is complete, the treatment solution is allowed to settle with the iron humate products precipitating out of the solution to form a solids residue. After settling, the resultant treated Water is separated from the solids residue (whether as a floating flocculant or as a precipitate that forms a lower solids Or sludge layer in the water). The treated water is preferably chlorinated after separation from the solids residue to minimize the formation of chlorinated organics which will contaminate the residue and the drinking water.

The iron humate product in the form of the solid residue is concentrated and dried by conventional equipment being used in the water treatment industry such as settling basins, clarifiers, mechanical filters, sludge drying beds and commercial sludge dryers. The resultant iron humate product typically dewaters very effectively and can achieve air dry solids concentrations up to 88% by weight solids. The iron-humate product of the present invention is characterized by a high iron concentration ranging from 15 to 45 percent by weight on a dry solids basis and preferably 28 to 33 percent by weight on a dry solids basis, low toxic organic and heavy metal contamination, high concentration of humic substances (an elemental carbon concentration generally greater than 30 percent by weight on a dry and ash free basis) and minimal concentration of iron hydroxides. The solids residue is characterized by a concentration of iron complexed as iron hydroxide of less than 25 percent by weight and preferably less than 10 percent by weight of the total iron present. After air drying, it has a medium brown color and has the consistency of a fine porous soil. The iron humate remains nearly insoluble in water (less than 1 ppm) or when stored in segregated piles, but slowly releases iron to the vegetation in mixed soil conditions More soluble, nitrogen enriched iron humate products are produced by contacting the partially hydrated iron humate products with a commercially available nitrogen source such as ammonia, ammonium hydroxide, urea, ammonium nitrate, and potassium nitrate. The resultant nitrogen enriched iron humate preferably contains nitrogen in the range of 0.5 to 12 percent by weight as nitrogen with a minimum water soluble iron content of 50 ppm as iron. The nitrogen enriched iron humate also turns from a medium brown color to a rich dark brown color. The mixture of the nitrogen enriched iron humate with water forms a dark brown solution, while the filtrate from mixing water with the iron humate is colorless.

Examples of the processes in accordance with the invention which follow are for the purpose of demonstrating specific processes in accordance with the invention and are not intended to be limiting in scope on the invention or claims.

EXAMPLE 1

A plant trial was conducted to treat the Hillsborough River Water in Tampa, Fla. with ferric sulfate for color removal. Sulfuric acid was added upstream of a flash mix tank to maintain a desired coagulation pH at a setpoint of 4.5 pH units. A high purity ferric sulfate in accordance with the invention was added at the entrance of the flash mix tank to maintain an average iron dosage of 21 milligrams/liter to treat an average raw water color of 105 standard color units (SCU) to a maximum of 15 standard color units before chlorination. The raw water dissolved organic carbon (DOC) averaged 15.9 ppm (an indication of the dissolved humic substances present) with reduction of the DOC in the water by application of ferric sulfate in accordance with the invention averaged over 72% by weight. The resultant iron humate sludge precipitate was concentrated using a Clarifier, mechanically dewatered using a belt filter press to 18% by weight solids and then dried in a conventional sludge drying bed to a dry solids content of 88% by weight. This unmodified iron humate contained 32% by weight iron on a dry solids basis. The humate material, when mixed with excess water, produced a clear filtrate with less than 1 milligram/liter soluble iron. Additional elemental and composition data relating to the unmodified iron humate product are provided in Tables 2 and 3. Data for Tables 2 and 3 were taken from samples of unmodified iron humate taken randomly from the resultant iron humate product.

EXAMPLE 2

The unmodified iron humate product from above Example 1 was contacted with anhydrous ammonia in excess in a pressure vessel at 50 pounds per square inch (psi) for 48 hours at ambient temperatures and then dried. The resultant nitrogen content was 4.71% by weight on a dry weight basis. The nitrogen enriched iron humate had turned to a rich dark brown. The iron solubility had increased by a factor of greater than 500. Elemental and compositional analysis of the ammonia-nitrogen enriched iron humate product are provided in Tables 2 and 3. Data for Tables 2 and 3 were taken from samples of nitrogen enriched iron humate taken randomly from the resultant iron humate product.

TABLE 2

| COMPOSITIONAL ANALYSIS* | | | | | |
|---|---|---|---|---|---|
| | | | Percent by weight | | |
| | pH | Ash | Moisture | Volatiles | Iron |
| Unmodified | 4.8 | 49 | 12 | 39 | 32 |
| Nitrogen Enriched | 8.3 | 36 | 14 | 50 | 23 |

*The weight percents for ash, moisture, volatiles and iron were determined after roasting the resultant unmodified and ammonia-nitrogen enriched iron humate products at 1000° Centigrade until dry.

TABLE 3

| ELEMENTAL ANALYSIS | | |
|---|---|---|
| | Percent by weight of dry and ash free humate | |
| Element | Unmodified Iron Humate | Nitrogen Enriched Iron Humate |
| Carbon | 40 | 43 |
| Hydrogen | 4 | 6 |
| Nitrogen | 0.9 | 4 |
| Oxygen | 55 | 46 |

EXAMPLE 3

100 pounds (dry weight) of the unmodified iron humate product from above Example 1 was mixed with 29 pounds of urea and then stored at ambient temperature and pressure for 24 hours in a closed atmosphere to produce a nitrogen enriched from humate product. The nitrogen content of the nitrogen enriched iron humate had risen from 0.6 to 10.9 percent by weight. The nitrogen enriched iron humate had turned to a rich dark brown. The iron solubility had increased by a factor of more than 100.

EXAMPLE 4

Plugs of turf grass and soil from a horticultural field laboratory were prepared for testing in triplicate with dosages of 2.5, 7.5 and 25.0 pounds of iron humate product made in accordance with Example 1 and Example 3 per acre applied to separate plots. Uniform rates of nitrogen, phosphorous, and potassium were applied to all plots. Visual ratings were performed bi-weekly and clippings for growth rate and iron uptake measurements Were conducted weekly for two weeks. Both the urea-nitrogen enriched iron humate of Example 3 and the unmodified iron humate of Example 1 Were compared against equivalent iron dosages from other iron sources, in particular, ferrous sulfate, a commercial iron ohelate sold under the trademark Sequesterene 138-Fe and a control group with no added iron. The results of the iron uptake and vegetation growth measurements for the first two weeks are shown on Table 4. In general, the nitrogen enriched iron humate samples outperformed the unmodified iron humate samples. Although the commercial iron products outperformed the iron humates on an efficiency basis, higher dosages of the iron humates outperformed the lower dosages of the commercial organic chelate. All the iron humate samples outperformed the control samples and also had a much greener appearance.

TABLE 4

| Iron Source | lbs Fe/ Acre | Fe Uptake (mg Fe/pot*) | Week 1 Growth (g/pot) | Week 2 Growth (g/pot) | Total Growth |
|---|---|---|---|---|---|
| 1. Iron Humate | 2.5 | 0.182 | .42 | .60 | 1.02 |
| 2. Iron Humate | 7.5 | 0.151 | .43 | .60 | 1.03 |
| 3. Iron Humate | 25.0 | 0.183 | .51 | .59 | 1.10 |
| 4. Nitrogen Enriched Iron Humate | 2.5 | 0.201 | .46 | .69 | 1.15 |
| 5. Nitrogen Enriched Iron Humate | 7.5 | 0.148 | .40 | .54 | .94 |
| 6. Nitrogen Enriched Iron Humate | 25.0 | 0.224 | .42 | .69 | 1.11 |
| 7. Sequesterene 138-Fe | 2.5 | 0.176 | .52 | .67 | 1.19 |
| 8. Sequesterene 138-Fe | 7.5 | 0.301 | .58 | .64 | 1.22 |
| 9. Ferrous Sulfate | 25.0 | 0.245 | .59 | .65 | 1.24 |
| 10. Control | 0 | 0.099 | .35 | .51 | .86 |

*Plant growth is expressed in g/pot which indicates the mass of the plant growth per pot in which plants are grown.

EXAMPLE 5

Iron uptake in young citrus trees was tested for the nitrogen enriched and unmodified iron humates of Examples 2 and 1 respectively and compared against two commercial iron chelates sold under the trademarks Sequesterene 138-Fe and LibFer SP and a control group with no added iron nutrients in a soil incubation study over 70 days. The results of the tissue analysis for iron are shown in Table 5. In Table 5, the headings Carrizo and Swingle represent the root stock of the young citrus trees on which the iron sources were applied. The ammonia-nitrogen enriched iron humate of Example 2 showed dramatically higher content than all other iron sources tested. The unmodified iron humate of Example 1 showed slightly lower to equivalent performance in comparison to the commercial iron chelates. All tested iron sources performed better than the control group.

The preliminary economics indicate that the iron humate products of the present invention are commercially viable compared to available iron sources. The analysis for iron of tissue samples from the citrus leaves of trees treated with the nitrogen enriched iron humate product indicate that these leaves contained more iron than the leaves of trees treated with Sequesterene 138-Fe. The cost of an effective amount of the nitrogen enriched iron humate product would be a fraction of the cost for a similarity effective amount of Sequesterene 138-Fe based upon the price thereof at the time of filing of this application, while still maintaining a healthy profit for the iron humate producer.

TABLE 5

Concentration of Iron in Leaves of Two Citrus Rootstocks 45 Days After Application of Iron Source

| Iron Source | Rate g Iron/plant | Iron in Leaves (mg/kg) Carrizo | Swingle |
|---|---|---|---|
| Nitrogen Enriched Iron Humate | 2 | 390 | 240 |
| Nitrogen Enriched Iron Humate | 1 | 338 | 213 |
| Nitrogen Enriched Iron Humate | 0.5 | 241 | 104 |
| Unmodified Iron Humate | 2 | 235 | 67 |
| Sequesterene 138-Fe | 0.5 | 225 | 98 |
| Sequesterene 138-Fe | 1 | 218 | 61 |
| Sequesterene 138-Fe | 0.25 | 216 | 112 |
| Unmodified Iron Humate | 1 | 205 | 98 |
| Unmodified Iron Humate | 0.5 | 198 | 70 |
| LibFer SP | 0.25 | 198 | 58 |
| Libfer SP | 1 | 190 | 61 |
| Libfer SP | 0.5 | 180 | 139 |
| CONTROL | 0 | 164 | 44 |

It is to be understood that while certain forms of the present invention have been illustrated and described herein, it is not to be limited to the specific forms or arrangement of parts described and shown.

What is claimed and desired to be secured by Letters Patent is as follows:

1. A method for the production of an iron humate product in a treatment process for treating a quantity of colored raw water; said iron humate product adapted for use in providing nutrients and organic matter to soil for use by vegetation grown in said soil; said method comprising the steps of:
   (a) adding an iron salt coagulant to said raw water to form a treatment solution;
   (b) controlling the pH of said treatment solution between 3.8 and 5.5 to provide for the addition of a minimum amount of said iron salt coagulant to the raw water to reduce the color of the raw water to a preselected level and to produce an iron humate product wherein the concentration of iron complexed as iron hydroxide in the iron humate product is less than 25 percent by weight on a dry solids basis;
   (c) separating said iron humate product from said treatment solution;
   (d) concentrating and drying said iron humate product; and
   (e) contacting said iron humate product with a nitrogen source to produce a nitrogen enriched iron humate product that contains nitrogen in the range of 0.5 to 12 percent by weight as nitrogen with a minimum water soluble iron content of 50 ppm as iron.

2. The method as defined in claim 1 wherein said step of controlling includes:
   (a) periodically sampling the raw material;
   (b) finding the pH value of the sampled water to produce an optimum coagulation effect in the water;
   (c) adding iron salt coagulant to find the optimum concentration of iron salt coagulant to coagulate components of the water to form iron humate without producing substantial quantities of iron hydroxides; and
   (d) adjusting the addition of the iron salt coagulant for producing said optimum concentration within said water.

3. The method as described in claim 1 including the step of:
(a) applying the iron humate product to soil to provide nutrients and organic matter to said soil for use by vegetation grown in said soil.

4. The method as described in claim 1 including the step of:
(a) applying said iron humate product to soil in which vegetation having an iron deficiency is being grown to provide iron to the vegetation.

5. The method as described in claim 1 including the step of:
(a) selecting said iron salt from the group consisting of ferric sulfate, ferrous sulfate, polyferric sulfate, ferric chloride, ferrous chloride and polyferric chloride.

6. The method as described in claim 5 including the step of:
(a) contacting said iron humate product with a nitrogen source selected from the group consisting of ammonia, ammonium hydroxide, urea, ammonium nitrate and potassium nitrate so as to produce a nitrogen enriched iron humate product.

7. The method as described in claim 6 including the step of:
(a) applying the nitrogen enriched iron humate product to soil to provide nutrients and organic matter to said soil for use by the vegetation grown in said soil.

8. The method of claim 1 wherein:
(a) the concentration of iron complexed as iron hydroxide in the iron humate product is less than 10 percent by weight on a dry solids basis.

9. A method for the production of an iron humate product from a treatment process for treating a quantity of colored raw water; said iron humate product adapted for use in providing nutrients and organic matter to soil for use by vegetation grown in said soil; said method comprising the steps of:
(a) lowering the pH of the raw water to within approximately a pH range between 3.8 and 5.5 to form an acidified solution;
(b) adding an amount of an iron salt coagulant to said acidified solution while controlling said adding so as to produce an iron humate product with a concentration of iron complexed as iron hydroxide in the iron humate product of less than 10 percent by weight of said product on a dry solids basis; said iron humate product precipitating out of said acidified solution to form a solid residue containing said iron humate product and a liquid layer comprising treated water;
(c) separating said iron humate product from said treated water;
(d) concentrating and drying said iron humate product; and
(e) adding a source of nitrogen to said iron humate product selected from the group consisting of ammonia, ammonium hydroxide, urea, ammonium nitrate and potassium nitrate so as to produce a nitrogen enriched iron humate product that contains nitrogen in the range of 0.5 to 12 percent by weight as nitrogen with a minimum water soluble iron content of 50 ppm as iron.

10. The method as described in claim 9 including the step of:
(a) selecting said iron salt from the group consisting of ferric sulfate, ferrous sulfate, polyferric sulfate, ferric chloride, ferrous chloride and polyferric chloride.

11. The method as described in claim 9 including the step of:
(a) applying the nitrogen enriched iron humate product to soil in which vegetation having an iron deficiency is being grown to provide iron to the vegetation having an iron deficiency.

12. A method for providing nutrients and organic matter to vegetation comprising the step of applying to the soil in which the vegetation is grown a nitrogen enriched iron humate product produced by adding a sufficient concentration of an iron salt coagulant to a quantity of raw water having a pH between from 3.8 and 5.5 to reduce the organic color of the water to a preselected level while producing an iron humate product such that the concentration of iron complexed as iron hydroxide in the iron humate product is less than 25 percent by weight of said product on a dry solids basis and contacting said iron humate product with a nitrogen source to produce said nitrogen enriched iron humate product that contains nitrogen in the range of 0.5 to 12 percent by weight as nitrogen with a minimum water soluble iron content of 50 ppm as iron.

13. The method as described in claim 12 including the step of:
(a) selecting said iron salt from the group consisting of ferric sulfate, ferrous sulfate, polyferric sulfate, ferric chloride, ferrous chloride, polyferric chloride and mixtures thereof.

14. The method as described in claim 13 including the step of:
(a) contacting said iron humate product with a nitrogen source selected from the group consisting of ammonia, ammonium hydroxide, urea, ammonium nitrate, potassium nitrate and mixtures thereof so as to produce a nitrogen enriched iron humate product.

15. The method of claim 12 wherein:
(a) the concentration of iron complexed as iron hydroxide in the iron humate product is less than 10 percent by weight on a dry solids basis.

* * * * *